United States Patent [19]
Epworth

[11] Patent Number: 5,463,487
[45] Date of Patent: Oct. 31, 1995

[54] OPTICAL TRANSMISSION SYSTEM

[75] Inventor: Richard E. Epworth, Sawbridgeworth, United Kingdom

[73] Assignee: Northern Telecom Limited, Montreal, Canada

[21] Appl. No.: 283,263

[22] Filed: Jul. 29, 1994

[30] Foreign Application Priority Data

Jul. 31, 1993 [GB] United Kingdom ............... 9315912

[51] Int. Cl.$^6$ ............................................. H04J 14/02
[52] U.S. Cl. ........................... 359/124; 359/161; 359/160
[58] Field of Search ..................................... 359/110, 115, 359/124, 134, 160–161, 173, 187–188, 194–195, 341; 372/6; 330/59, 308

[56] References Cited

U.S. PATENT DOCUMENTS

| 5,035,481 | 7/1991 | Mollenauer | 359/124 |
| 5,276,543 | 1/1994 | Olshansky | 359/124 |
| 5,280,383 | 1/1994 | Federici et al. | 372/6 |

FOREIGN PATENT DOCUMENTS

| 5191380 | 7/1993 | Japan | 359/124 |

*Primary Examiner*—Leo H. Bodreau
*Assistant Examiner*—Kinfe-Michael Negash
*Attorney, Agent, or Firm*—Lee, Mann, Smith, McWilliams, Sweeney & Ohlson

[57] ABSTRACT

In a wavelength division optical transmission system incorporating optical amplifiers, an identifying pilot tone is modulated on to each multiplexed wavelength. Each system amplifier determines from the pilot tones the total number of wavelengths being transmitted and thereby provides a corresponding adjustment of the amplifier gain. This prevents overamplification when one or more wavelengths is missing from the multiplexed signal e.g. as the result of a transmitter fault.

5 Claims, 1 Drawing Sheet

OPTICAL TRANSMISSION SYSTEM

BACKGROUND TO THE INVENTION

This invention relates to optical transmission systems, and in particular to systems in which transmitted signals are wave division multiplexed.

Wave division multiplexing (WDM) is being introduced as a means of increasing the traffic handling capacity of optical fiber transmission systems. In a WDM system each individual fiber carried signals at a number of wavelengths, typically four. When these signals are transmitted over long distances, periodic regeneration of the signals is necessary. Currently, this amplification is generally effected by demultiplexing the different wavelengths and then converting the light signals to corresponding electrical signals. These electrical signals are regenerated and then reconverted to light signals.

In an effort to reduce equipment costs, attempts have been made to replace the optoelectronic regenerators with optical amplifiers, e.g. erbium fiber amplifiers. Such amplifiers have the advantage both of relatively low cost and the ability to amplify all the wavelengths without the need for demultiplexing.

In most single wavelength optically amplified transmission systems, each optical amplifier is arranged to provide a substantially constant total mean power output to ensure that transmission quality is maintained. Attempts to introduce amplifiers of this type to WDM systems have not proved successful. The basic problem is that of determining the appropriate amplification factor of an amplifier from the input signal power. Current signals measure the total input power irrespective of wavelength. If all the multiplexer wavelengths are present at the input of an amplifier then an appropriate amplification factor can be determined. However if one or more wavelength is missing from the input signal, e.g. under fault conditions, this causes a corresponding drop in the total input power. To compensate for this power drop the amplifier increases its gain and thus amplifies the remaining wavelength with an effectively increased gain factor resulting in too high an output power from these wavelengths. For example, temporary loss of three wavelengths in a four-wavelength WDM system can result in a 6 dB increase in the power output of the remaining wavelength. This can incur serious penalties arising from non-linearity induced by spectral broadening. In particular, this spectral broadening results in an increased time dispersion of the signal.

The object of the present invention is to minimise or to overcome this disadvantage.

SUMMARY OF THE INVENTION

According to the invention there is provided a wavelength division multiplex (WDM) optical transmission system, including a transmitter, a receiver and an amplified optical transmission path therebetween, wherein the transmitter has means for associating identification signals one with each transmitted wavelength, and wherein each amplifier of the transmission path has means for determining from the identification signal the number of wavelengths present on the transmission path whereby to control the total power output of that amplifier.

Typically, each identification signal comprises a unique pilot tone that is modulated on to the optical carrier.

The technique may be employed both for landline and submarine applications.

BRIEF DESCRIPTION OF THE DRAWINGS

Embodiments of the invention will now be described with reference to the accompanying drawings in which.

DETAILED DESCRIPTION OF PREFERRED EMBODIMENTS

Figure 1:
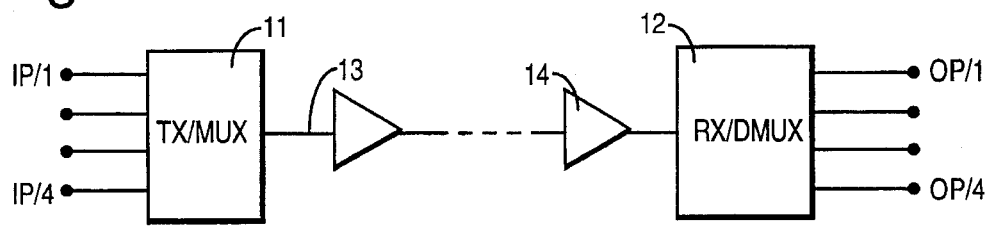
FIG. 1 is a schematic diagram of a wave division multiplex (WDM) optical transmission system.

Referring to FIG. 1, the wavelength multiplex transmission system includes a transmitter station 11, a receiver station 12 and an optical fiber transmission path 13, therebetween. Signals transmitted along the path 13 are amplified by amplifier stations 14 disposed at spaced intervals along the path.

The transmitter station 11 incorporates multiplexing means whereby a number of wavelengths (typically four) carrying information signals from inputs IP1 to IP4 are multiplexed on to a single transmission fiber 13. Similarly the receiver station 12 incorporates a demultiplexer whereby the transmitted signals are received at outputs OP1 to OP4. Each amplifier station 14 amplifies all wavelengths present on the transmission path.

In addition to the communications/data traffic carried by the light signals on the fiber path 13, the transmitter modulates each transmitted wavelength with a characteristic identification signal or pilot tone unique to that wavelength.

Figure 2:
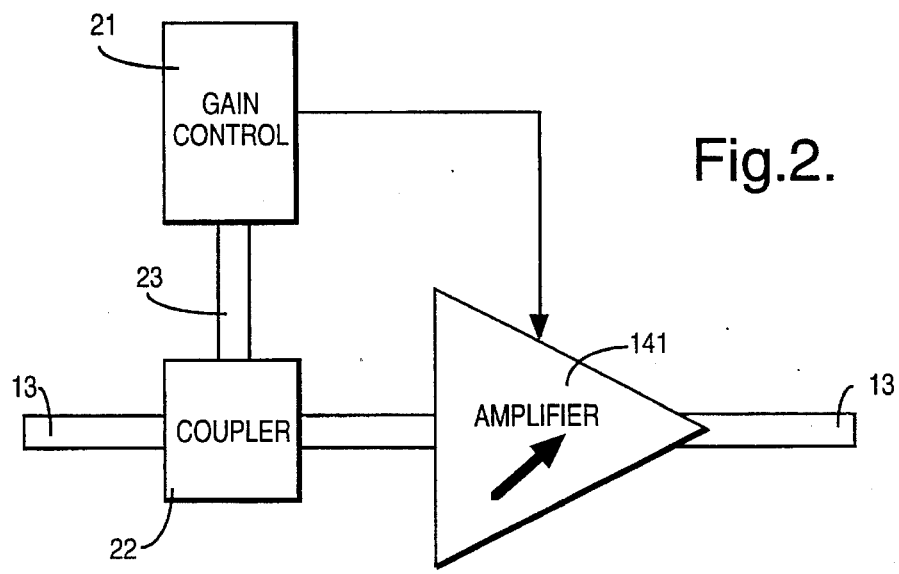
FIG. 2 illustrates an amplifier station constructions for use in the system of FIG. 1.

Referring now to FIG. 2, this shows in schematic form an amplifier station construction for use in the transmission system of FIG. 1. Signals transmitted along the transmission path 13 are amplified by an amplifier 141, typically an erbium fiber amplifier, whose gain is controlled via a gain control circuit 21. At either the input or the output of the amplifier 141, the transmission fiber 13 is provided with a coupler 22 whereby a small proportion of the transmitted light is fed via a fiber 23 to the gain control circuit 22. The circuit 22 recovers the identification signal from each wavelength present in the multiplexed transmitted signal and thus determines the number of wavelengths present in the signal. As a result of this determination, the gain control circuit provides an output signal to the amplifier 141 whereby to control the amplifier gain. Typically, this output signal is used to control the power output of a pump laser (not shown) associated with the amplifier.

Figure 3:
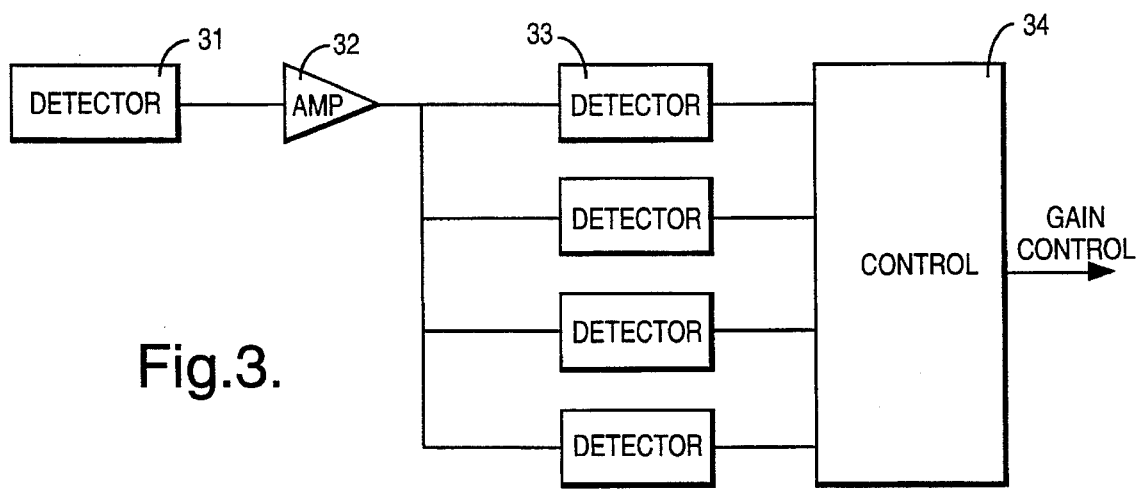
FIG. 3 shows a gain control arrangement for use in the amplifier station of FIG. 2.

FIG. 3 shows the gain control circuit in more detail. The received light signals are converted to corresponding electrical signals by detectors 31 whose output is coupled via a pre-amplifier 32 to a number of detector circuits 33, there being one circuit 33 for each multiplexed wavelength. Each detector circuit 33 responds only to its respective identification signal and in response thereto provides an output to a control circuit 34. The control circuit counts the total number of enabled inputs, and outputs a corresponding gain control signal whereby to determine the gain of the associated optical amplifier.

The identification signal may comprise a pilot tone that is amplitude modulated on the respective optical carrier. For example, pilot tones of 1.533 MHz, 1.545 MHz and 1.557 MHz could be modulated on carriers of wavelength 1.533 microns, 1.545 microns and 1.557 microns respectively. The presence of a pilot tone then indicates the presence of the corresponding carrier. Where a pilot tone of this type is employed, each detector 33 (FIG. 3) may comprise a phase locked loop voltage controlled oscillator and an associated phase sensitive detector which produces a representation of the optical spectrum.

Alternatively, each detector may comprise an electrical filter and a diode detector.

By identifying the presence or absence of each pilot tone, the control circuit 34 (FIG. 3) determines the output signal to control the gain of the optical amplifier at an appropriate level.

In a further application, the control circuit may determine the amplitude of each tone whereby to provide a more sophisticated gain control function. This control function may also take into account differences in amplitude between channels, a knowledge of the non-linear power limits of the route (due to the strongest channel) and the signal to noise problems on the weakest channel.

In a further embodiment each identification signal may comprise a unique digital code modulated on to the respective wavelength. With such a technique, each detector 33 (FIG. 3) may be provided with a memory for storing the respective code and means for detecting a match of the code with the received signals.

In a further development of the technique described above, the gain control mechanism may be adapted to maintain a power balance between different wavelength channels in a system having non-flat gain/wavelength characteristics. The cause of this departure from the ideal flat response may for example be non-flatness of the gain mechanism, pump combining couplers or the wavelength dependancy of the fiber loss. The signal power measurement system described above may be employed to provide an input to a control loop which flattens the overall system gain. This may, for example, be achieved by changing the ratio of the pump power from two lasers which would be of different wavelength (e.g. 980 and 1480 nanometres) or by the use of co-and counterpumping. As the gain characteristic is sensitive to these factors, sufficient variation of the overall gain may be provided to achieve a substantially flat response.

I claim:

1. A wavelength division multiplex (WDM) optical transmission system, including a transmitter, a receiver and an amplified optical transmission path therebetween, wherein the transmitter is provided with multiplexer means for multiplexing a plurality of wavelengths each carrying information signals on to the transmission path, wherein the transmitter has means for modulating the transmitted wavelengths each with a respective identification signal, and wherein each amplifier of the transmission path has detection means for recovering the identification signal from each wavelength present on the transmission path and gain control means for determining, from the recovered identification signals the number of wavelengths present on the transmission path whereby to control the total power output of that amplifier.

2. A WDM transmission system as claimed in claim 1, wherein each said identification signal comprises a pilot tone amplitude modulated on the respective optical carrier.

3. A WDM transmission system as claimed in claim 1, wherein each said identification signal comprises a digital code modulated on the respective optical carrier.

4. A WDM transmission system as claimed in claim 1, and said gain control means incorporates means for determining the amplitude of each wavelength of said plurality of multiplexed wavelengths.

5. A WDM transmission system as claimed in claim 1, wherein each said amplifier incorporates a laser pumped amplifying fiber, the amplifier gain being determined by control of the pump power of the laser.

* * * * *